US012542822B2

(12) United States Patent
Hiraoka et al.

(10) Patent No.: US 12,542,822 B2
(45) Date of Patent: Feb. 3, 2026

(54) COMMUNICATION SYSTEM, COMMUNICATION APPARATUS, COMMUNICATION METHOD, AND READABLE-MEDIUM

(71) Applicant: NEC Corporation, Tokyo (JP)

(72) Inventors: Hisao Hiraoka, Tokyo (JP); Yoshitaka Takei, Tokyo (JP)

(73) Assignee: NEC CORPORATION, Tokyo (JP)

( * ) Notice: Subject to any disclaimer, the term of this patent is extended or adjusted under 35 U.S.C. 154(b) by 26 days.

(21) Appl. No.: 18/832,963

(22) PCT Filed: Mar. 18, 2022

(86) PCT No.: PCT/JP2022/012778
§ 371 (c)(1),
(2) Date: Jul. 25, 2024

(87) PCT Pub. No.: WO2023/175951
PCT Pub. Date: Sep. 21, 2023

(65) Prior Publication Data
US 2025/0159037 A1    May 15, 2025

(51) Int. Cl.
*H04L 67/02* (2022.01)
*H04L 67/14* (2022.01)
(52) U.S. Cl.
CPC .............. *H04L 67/02* (2013.01); *H04L 67/14* (2013.01)
(58) Field of Classification Search
None
See application file for complete search history.

(56) References Cited

U.S. PATENT DOCUMENTS

| 7,870,153 B2* | 1/2011 | Croft | G06F 16/748 |
| | | | 709/219 |
| 2007/0174429 A1* | 7/2007 | Mazzaferri | H04L 63/102 |
| | | | 709/218 |

(Continued)

FOREIGN PATENT DOCUMENTS

| JP | 2002-335268 A | 11/2002 |
| JP | 2006-287417 A | 10/2006 |

(Continued)

OTHER PUBLICATIONS

International Search Report for PCT Application No. PCT/JP2022/012778, mailed on May 31, 2022.

(Continued)

*Primary Examiner* — Quang N Nguyen
(74) *Attorney, Agent, or Firm* — Sughrue Mion, PLLC

(57) ABSTRACT

To provide a communication system adapted to reduce network bandwidth usage. The communication system according to the present disclosure includes a server (102) and a communication apparatus (101) for performing REST (Representational State Transfer) communication using an HTTP (Hypertext Transfer Protocol) session established with the server (102). The communication apparatus is (101) configured to transmit a keepalive signal to the server (102) after the REST communication that has been initiated based on a calling signal received from a client apparatus (105) ends and to transmit a response signal in response to the calling signal to the client apparatus (105) while maintaining the HTTP session.

11 Claims, 7 Drawing Sheets

(56) References Cited

U.S. PATENT DOCUMENTS

| | | |
|---|---|---|
| 2007/0198684 A1 | 8/2007 | Mizushima |
| 2020/0344084 A1* | 10/2020 | Shribman ........... H04L 67/5681 |
| 2022/0103525 A1* | 3/2022 | Shribman ........... G06F 16/9574 |
| 2023/0367833 A1* | 11/2023 | Kol ....................... G06F 16/958 |

FOREIGN PATENT DOCUMENTS

| | | |
|---|---|---|
| JP | 2007-226398 A | 9/2007 |
| JP | 2016-534607 A | 11/2016 |
| JP | 2017-538179 A | 12/2017 |

OTHER PUBLICATIONS

JP Office Action for JP Application No. 2024-507452, mailed on Mar. 18, 2025 with English Translation.

* cited by examiner

COMMUNICATION SYSTEM, COMMUNICATION APPARATUS, COMMUNICATION METHOD, AND READABLE-MEDIUM This application is a National Stage Entry of PCT/JP2022/012778 filed on Mar. 18, 2022, the contents of all of which are incorporated herein by reference, in their entirety.

TECHNICAL FIELD

The present disclosure relates to a communication system, a communication apparatus, a communication method, and a program.

BACKGROUND ART

Patent Literature 1 discloses a configuration for performing REST (Representational State Transfer) type communication (hereinafter referred to as "REST communication") via HTTP (Hypertext Transfer Protocol) in client-server communication.

CITATION LIST

Patent Literature

Patent Literature 1: Published Japanese Translation of PCT International Publication for Patent Application, No. 2016-534607

SUMMARY OF INVENTION

Technical Problem

REST refers to a design concept used as a lightweight and simple web interface using XML (Extensible Markup Language) or HTTP. One of the characteristics of REST communication is that the server and a communication apparatus that relays the client and the server do not hold the client's session information or the result of processing, and the output is uniquely determined by the content of the input. This eliminates the need for the server to hold and reflect the previous session information, thereby simplifying the systems of the server and communication apparatus.

In addition, since the request from the client contains all the information necessary for performing processing, the request can be processed in the same manner by a server different from the server used for communication up to that point. Therefore, since there is no need to synchronize the client information between servers, it is easy to scale out the servers.

A communication apparatus, which relays communication between the client and the server, establishes an HTTP session between it and the server when a request from the client is sent to the server. Then, the response from the server is sent to the client, the HTTP session with the server is disconnected, and these operations are repeated.

The communication apparatus conducts establishment and disconnection of HTTP sessions for each request from the client. This leads to the use of many packets for establishment and disconnection of the HTTP sessions, which causes congestion in the network bandwidth between the communication apparatus and the server.

In view of the above, an object of the present disclosure is to provide a communication system adapted to reduce network bandwidth usage.

Solution to Problem

A communication system according to the present disclosure includes: a server; and a communication apparatus for performing a REST communication using an HTTP session established with the server, wherein the communication apparatus is configured to transmit a keepalive signal to the server after the REST communication that has been initiated based on a calling signal received from a client apparatus ends, and to transmit a response signal in response to the calling signal to the client apparatus while maintaining the HTTP session.

A communication apparatus according to the present disclosure includes: a communication unit configured to perform a REST communication using an HTTP session established with a server; and a session control unit configured to transmit a keepalive signal to the server via the communication unit after the REST communication that has been initiated based on a calling signal received from a client apparatus ends and maintain the HTTP session, wherein the communication unit is configured to transmit a response signal in response to the calling signal to the client apparatus while maintaining the HTTP session.

A communication method according to the present disclosure includes: initiating a REST communication using an HTTP session established with a server based on a calling signal received from a client apparatus: transmitting a keepalive signal to the server to maintain the HTTP session after the REST communication ends; and transmitting a response signal in response to the calling signal to the client apparatus while maintaining the HTTP session.

A program according to the present disclosure causes a computer to execute processes of: initiating a REST communication using an HTTP session established with a server based on a calling signal received from a client apparatus: transmitting a keepalive signal to the server to maintain the HTTP session after the REST communication ends; and transmitting a response signal in response to the calling signal to the client apparatus while maintaining the HTTP session.

Advantageous Effects of Invention

According to the present disclosure, it is possible to provide a communication system adapted to reduce network bandwidth usage.

EXAMPLE EMBODIMENT

First Example Embodiment

Figure 1:
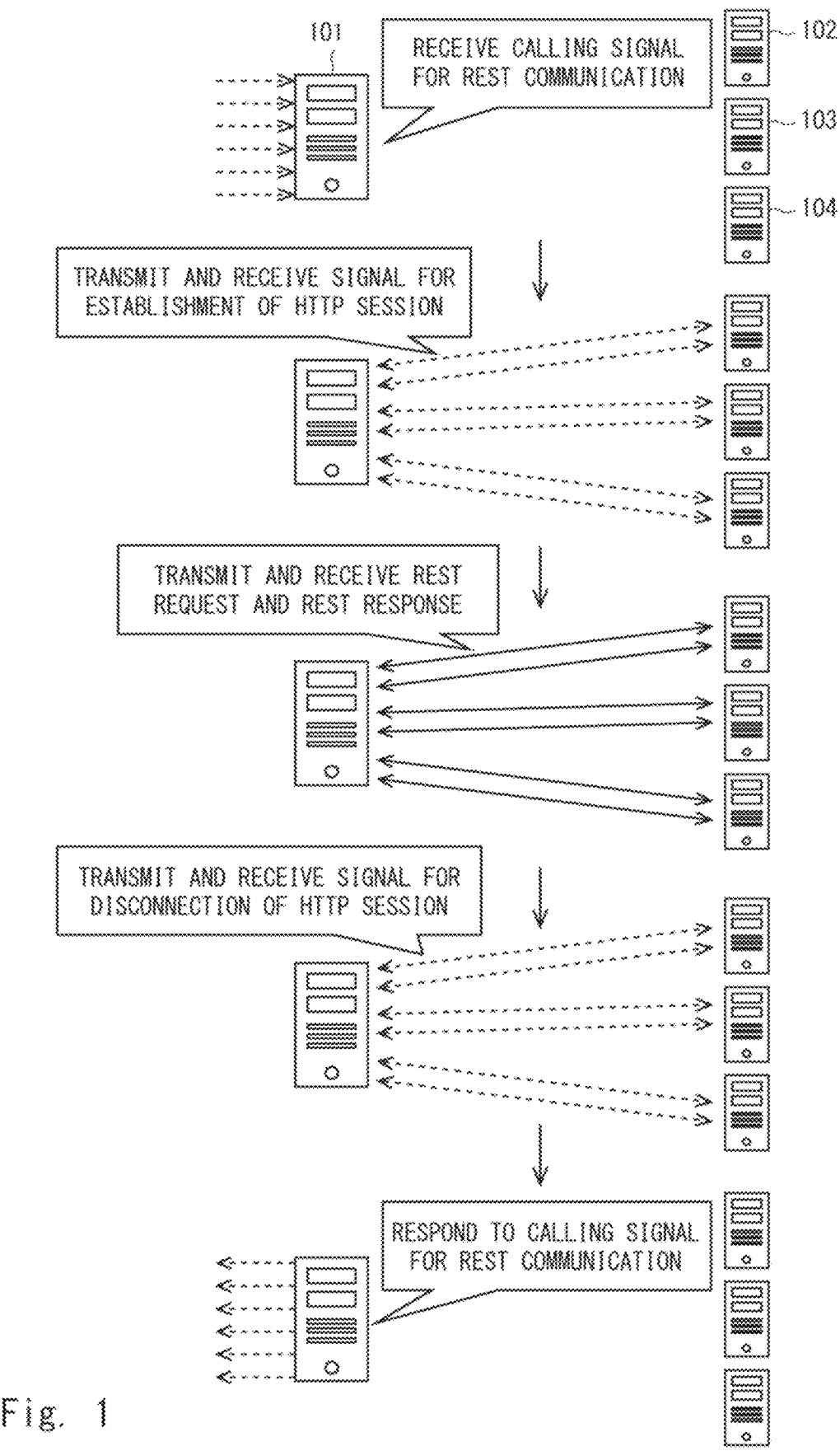
FIG. 1 is a diagram for describing an aspect of a communication system according to a first example embodiment when the communication method disclosed herein is not applied.

Example embodiments of the present disclosure will be described below with reference to the drawings. FIG. 1 shows an aspect of a communication system when the communication method of the present disclosure is not applied.

The communication system according to the present example embodiment includes a communication apparatus 101 and three servers 102, 103, and 104, and the communication apparatus 101 is configured to establish six HTTP sessions, two for each server. However, the number of servers and the number of HTTP sessions are not limited thereto.

The communication apparatus 101 shown in the first row in FIG. 1 receives a calling signal for the REST communication sent from the client, and is started-up upon receipt of the signal. The communication apparatus 101 that is started-up establishes an HTTP session with the servers 102, 103, and 104, respectively (see, the second row in FIG. 1).

After establishing the HTTP sessions, the communication apparatus 101 transmits a request based on a calling signal (hereinafter referred to as "REST request") to the servers 102, 103, and 104. Having received the REST request, the servers 102, 103, and 104 transmit a response based on the REST request (hereinafter referred to as "REST response") to the communication apparatus 101 (see, the third row in FIG. 1).

Having received the REST response, the communication apparatus 101 disconnects the HTTP sessions with the servers 102, 103, and 104 (see, the fourth row in FIG. 1) and transmits a response signal in response to the calling signal for the REST communication to the client (see, the fifth row in FIG. 1).

To establish an HTTP session between a communication apparatus and the servers, three signals of SYN/SYNACK/ACK are required, and to disconnect an HTTP session, four signals of FINACK/ACK/FINACK/ACK are required. That is, establishment and disconnection of HTTP sessions between a communication apparatus and the servers require seven packets per session.

As the number of client requests increases, the number of calling signals received by the communication apparatus increases, so the processing time and the number of packets required for establishment and disconnection of HTTP sessions also increase by the number of the calling signals. Therefore, the network bandwidth between a communication apparatus and the servers is congested due to operations other than exchange of information.

Figure 3:
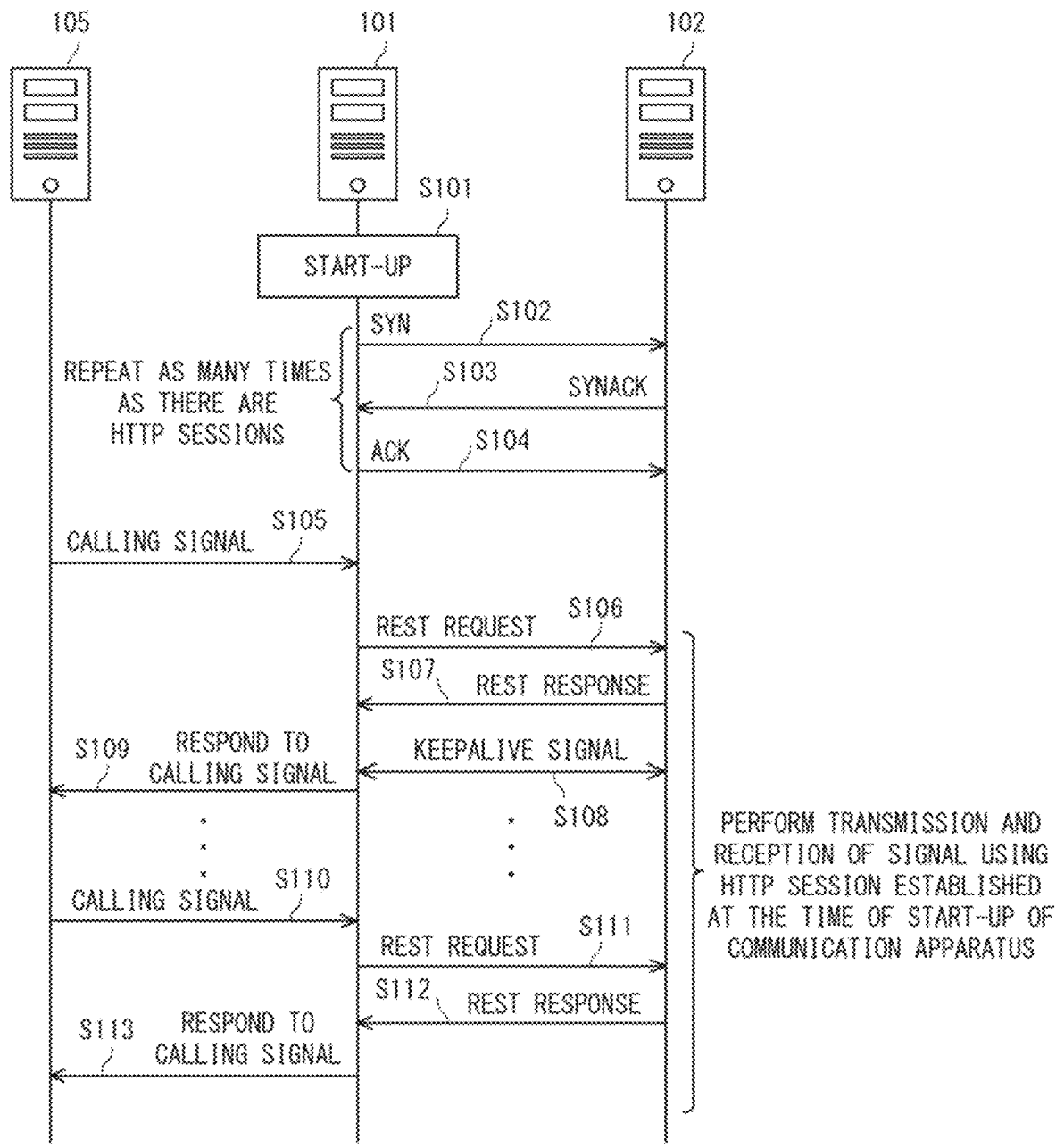
FIG. 3 is a sequence diagram for describing the processing of the communication system according to the first example embodiment.
Figure 4:
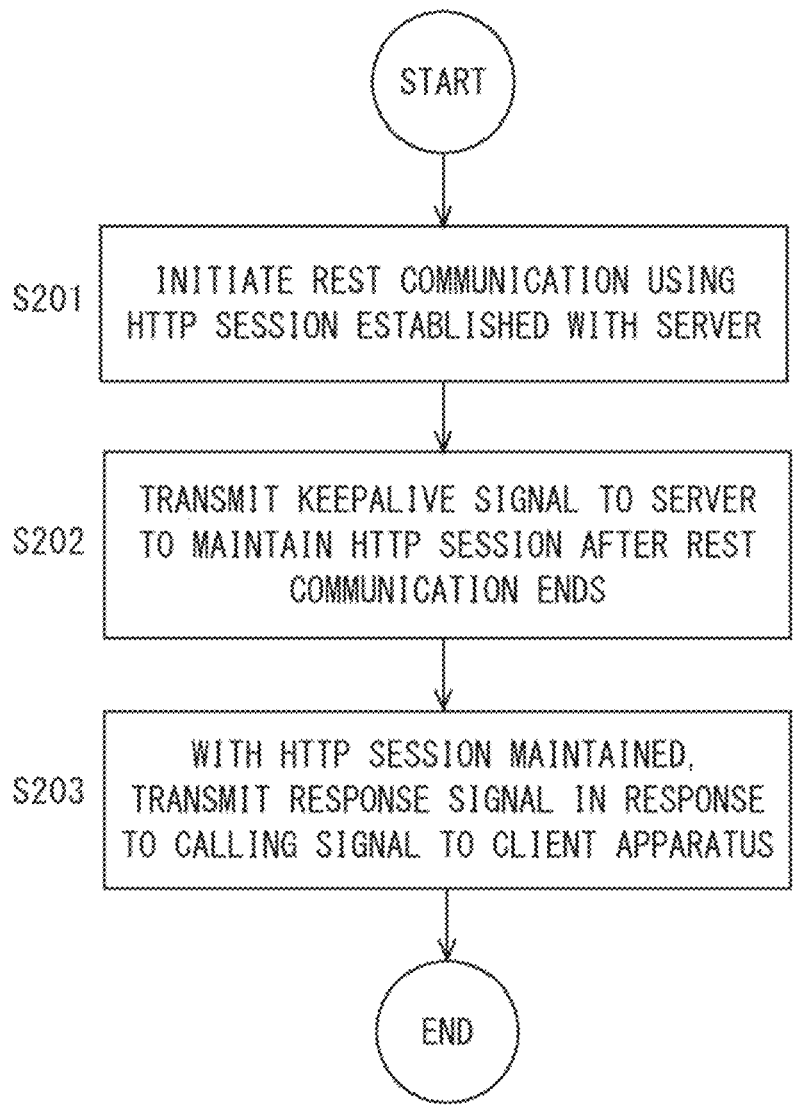
FIG. 4 is a flowchart for describing the communication method of the communication system according to the first example embodiment.

Next, an aspect of a communication system when the communication system and the communication method according to the present disclosure are applied will be described with reference to FIGS. 2, 3, and 4.

Figure 2:
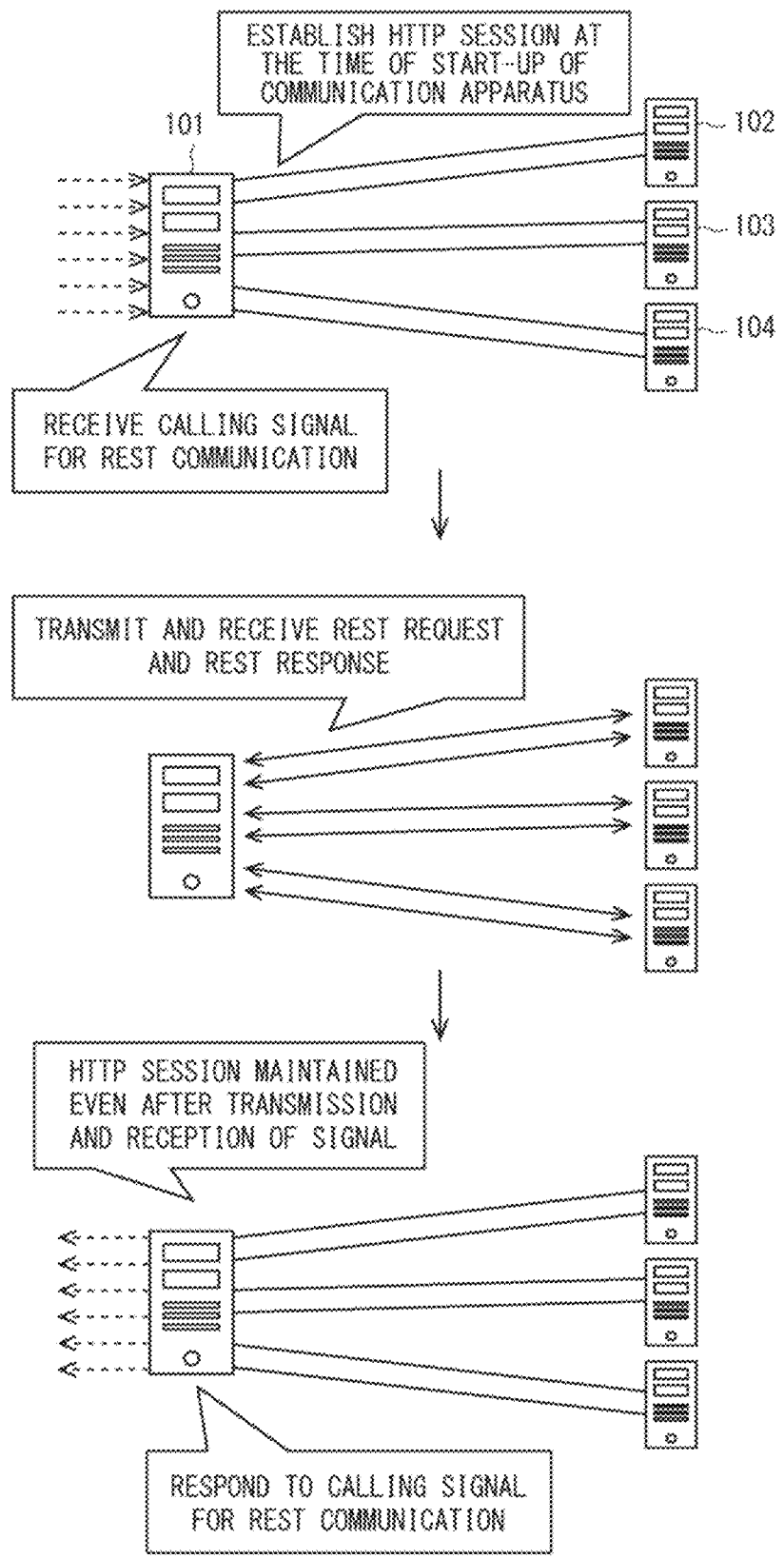
FIG. 2 is a diagram for describing an aspect of the communication system according to the first example embodiment when the communication method disclosed herein is applied.

The communication apparatus 101 shown in the first row in FIG. 2 is started-up before receiving a calling signal for the REST communication from the client and an HTTP session is pre-established with the servers 102, 103, and 104, respectively. The communication apparatus 101 then receives a calling signal sent from the client.

The communication apparatus 101 transmits a REST request to the servers 102, 103, and 104 to initiate REST communication. The servers 102, 103, and 104 transmit a REST response to the communication apparatus 101 (see, the second row in FIG. 2). The REST communication between the communication apparatus 101 and the servers 102, 103, and 104 ends upon receipt of the REST response by the communication apparatus 101.

Then, having received the REST response, the communication apparatus 101 transmits a response signal in response to the calling signal for the REST communication to the client while maintaining the HTTP sessions between the servers 102, 103, and 104 (see, the third row in FIG. 2).

The HTTP sessions are maintained by transmitting a keepalive signal from the communication apparatus 101 to the servers 102, 103, and 104.

Processing of the communication system according to the present disclosure will be described with reference to the sequence diagram of FIG. 3. For the sake of simplicity, only the server 102 out of the three servers 102, 103, and 104 is shown in FIG. 3. The operations of the server 103 and the server 104 are the same as the operation of the server 102.

After being started-up (S101), the communication apparatus 101 transmits a SYN signal requesting establishment of an HTTP session to the server 102 (S102). Having received the SYN signal, the server 102 transmits a SYN-ACK signal for allowing establishment of the HTTP session to the communication apparatus 101 (S103). Having received the SYNACK signal, the communication apparatus 101 transmits an ACK signal for initiating establishment of the HTTP session to the server 102 and establishes the HTTP session with the server 102 (S104). The communication apparatus 101 repeats these steps as many times as there are HTTP sessions.

Having established the HTTP session, the communication apparatus 101 receives a calling signal from a client apparatus 105 (S105) and transmits a REST request to the server 102 (S106). Having received the REST request, the server 102 transmits the REST response to the communication apparatus 101 (S107).

Having received the REST response, the communication apparatus 101 transmits a keepalive signal to the server 102, and having received the keepalive signal, the server 102 transmits a response signal in response to a keepalive signal to the communication apparatus 101 to thereby maintain the HTTP session (S108). Then, the communication apparatus 101 transmits a response signal in response to a calling signal to the client apparatus 105 (S109).

While maintaining the HTTP session with the server 102, the communication apparatus 101 receives the next calling signal from the client apparatus 105 (S110) and transmits and receives the next REST request and REST response to and from the server 102 (S111 and S112).

Then, the communication apparatus 101 which has performed REST communication only for a predetermined amount does not transmit a keepalive signal to the server 102, but transmits a response signal in response to a calling signal to the client apparatus 105 (S113).

Next, the communication method of the communication system according to the present disclosure will be described with reference to the flowchart of FIG. 4.

Based on a calling signal received from the client apparatus 105, the communication apparatus 101 initiates REST communication using the HTTP session established with the server 102 (S201). After the REST communication ends, the communication apparatus 101 transmits a keepalive signal to the server 102 to maintain the HTTP session between it and the server 102 (S202). With the HTTP session maintained, the communication apparatus 101 transmits a response signal in response to a calling signal to the client apparatus 105 (S203).

By maintaining an HTTP session between the communication apparatus 101 and the server 102 in this manner, it is possible to eliminate the step of performing an HTTP session from establishment to disconnection every time a calling signal is received.

Thus, even if the number of the client requests increases and the number of the calling signals received by the communication apparatus increases, the processing time and the number of packets required for establishment and disconnection of the HTTP sessions can be eliminated. Thus, the congestion in the network bandwidth between communication apparatus and server can be resolved.

Here, as an effect obtained by the communication system and communication method according to the present disclosure, the processing time and the number of packets required for establishment and disconnection of the HTTP sessions in a REST communication are calculated.

Assume that the communication apparatus maintains HTTP session for one hour (3600 seconds) by setting the number of times the communication apparatus can perform processing of a calling signal to 940 tps (Transaction Per Second) and the number of 100 HTTP sessions which the communication apparatus can establish at the time of start-up of the communication apparatus. Further, since seven packets are used every time establishment and disconnection of HTTP sessions are performed, the time required to process seven packets is set to 2 ms.

When the communication method of the present disclosure is not applied, processing time per hour is 940 (tps)×2 (ms)×3600 (s)=6,768,000 (ms), and the number of packets per hour is 940 (tps)×7 (packets)×3600 (s)=23,688,000 (packets).

On the other hand, when the communication method of the present disclosure is applied, after 100 HTTP sessions are established at the time of start-up of the communication apparatus, the HTTP sessions are maintained whereby processing of establishment and disconnection of subsequent HTTP sessions is unnecessary. Therefore, processing time per hour is 100 (sessions)×2 (ms)=200 (ms), and the number of packets per hour are 100 (sessions)×7 (packets)=700 (packets).

Thus, by applying the communication method according to the present disclosure, it is possible to reduce the processing time and the number of packets required for establishment and disconnection of HTTP sessions. Therefore, it is possible to provide a communication system that can reduce the network bandwidth usage.

Second Example Embodiment

In the present example embodiment, the processing in the case where a failure occurs in the server of the communication system according to the first embodiment will be described.

In order to guarantee the processing performance in the communication system, it is important to maintain the number of HTTP sessions. Therefore, when a failure occurs in a server, it is desirable that the communication apparatus allots the HTTP sessions established with the server in which the failure has occurred to other unaffected servers.

Figure 5:
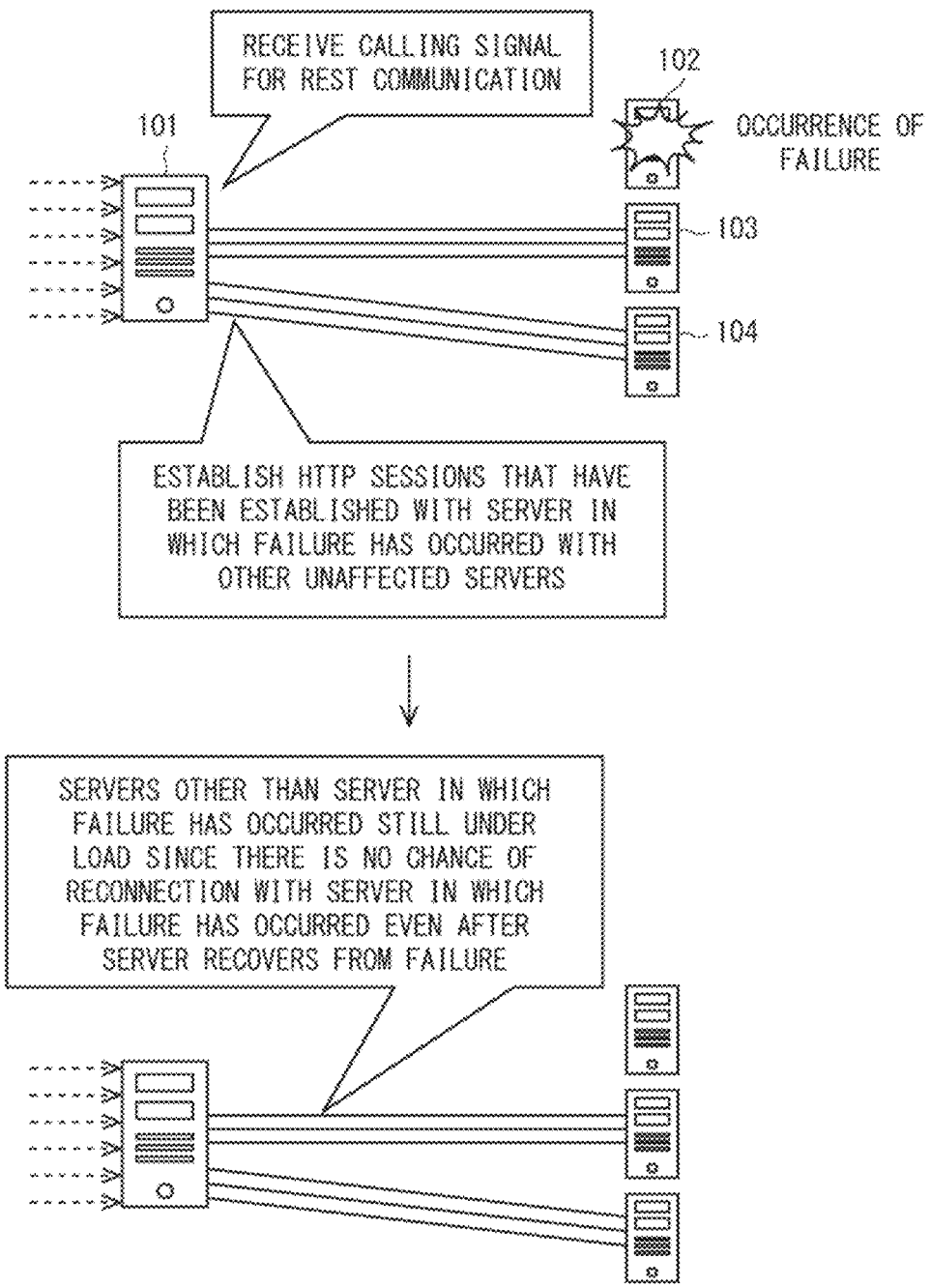
FIG. 5 is a diagram for describing the load between servers of the communication system according to a second example embodiment at the time of occurrence of server failure and after recovery from the server failure.

FIG. 5 shows an aspect of a communication system when a failure occurs in a server of the communication system according to the first example embodiment. As in the first example embodiment, the communication system according to the first example embodiment includes the communication apparatus 101 and the three servers 102, 103, and 104, and the communication apparatus 101 is configured to establish six HTTP sessions, two with each server. However, the number of servers and HTTP sessions is not limited thereto.

When failure occurs in the server 102 shown in the first row in FIG. 5, the communication apparatus 101 re-establishes the two HTTP sessions that have been established between it and the server 102 with the server 103 and the server 104 in order to maintain the total number of HTTP sessions that are established. Thus, the communication apparatus 101 establishes three HTTP sessions with the server 103 and the server 104, respectively.

The communication method according to the first embodiment reduces the number of processing time and the packets required for establishment and disconnection of the HTTP sessions by maintaining the HTTP sessions. However, since the communication apparatus 101 does not establish the HTTP sessions with the server 102 even after the server 102 recovers from the failure, the servers 103 and 104 are still under load (see, the second row in FIG. 5). Therefore, when the server 102 recovers from the failure, it is necessary to provide a new opportunity for the communication apparatus 101 to establish the HTTP session with the server 102 again.

The communication system and the communication method according to the present example embodiment enable quick balancing of the load of the HTTP session after recovery of the server.

The communication system and the communication method according to the present example embodiment will be described with reference to FIG. 6. When a failure occurs in the server 102 shown in the first row in FIG. 6, the communication apparatus 101 re-establishes the two HTTP sessions that have been established between it and the server 102 with the server 103 and the server 104. Thus, the communication apparatus 101 establishes three HTTP sessions with the server 103 and the server 104, respectively.

Figure 6:
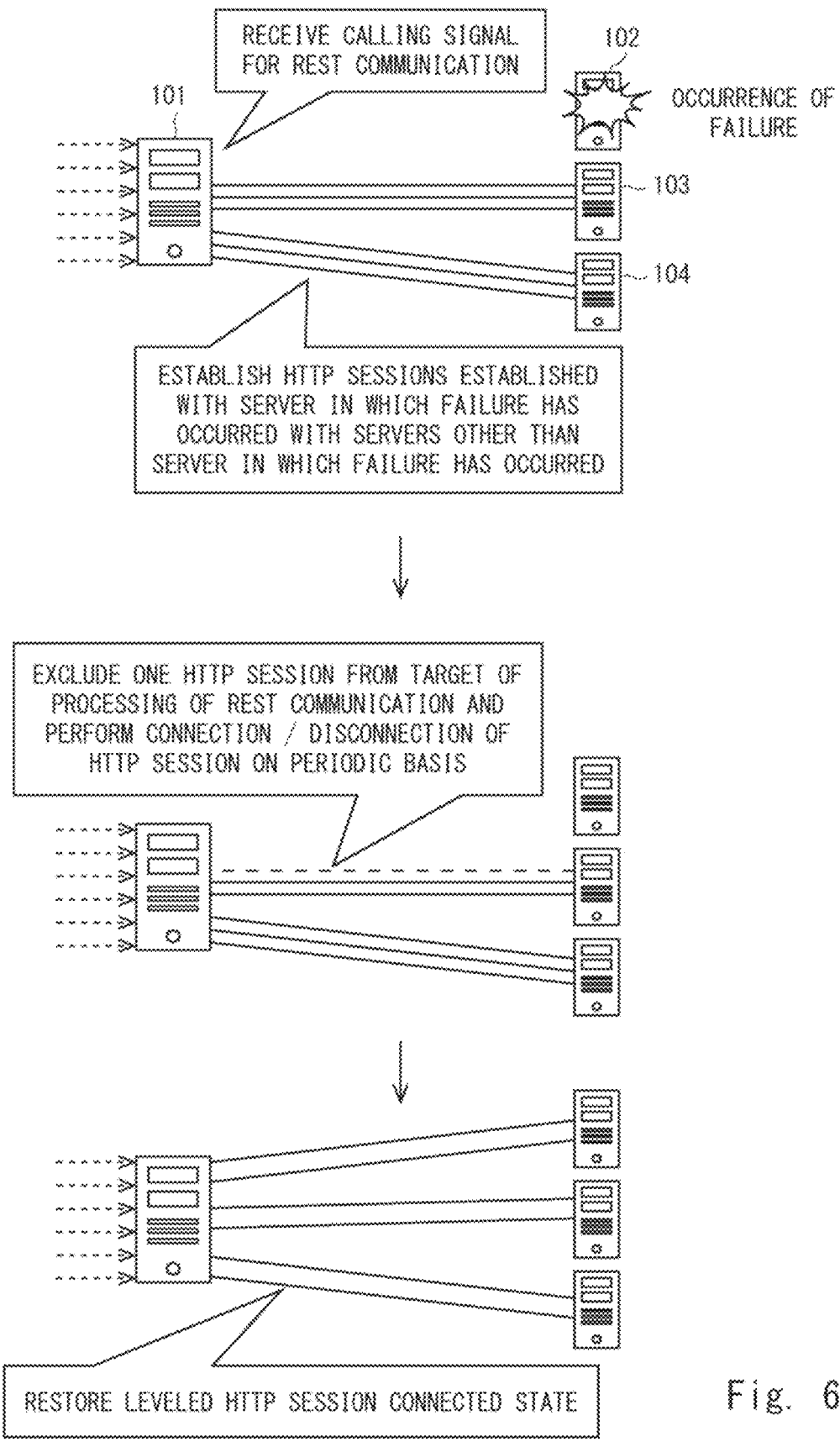
FIG. 6 is a diagram for describing balancing of the load between servers of the communication system according to the second example embodiment at the time of occurrence of server failure and after recovery from the server failure.

Here, the communication apparatus 101 selects one of the 6 HTTP sessions established with the server 103 and the server 104, excludes it from the transmission target of the keepalive signal, and disconnects the selected HTTP session (see, the second row in FIG. 6). Then, the communication apparatus 101 re-establishes the HTTP session which was disconnected. These series of steps are repeated on a periodic basis when the server 102 is not recovered.

In the case where the server 102 is not recovered when the communication apparatus 101 re-establishes the HTTP session, an HTTP session is established with the server 103 or the server 104. In the case where the server 102 is recovered when the communication apparatus 101 re-establishes an HTTP session, an HTTP session is established with the server 102.

In this way, by providing an opportunity to establish an HTTP session with the recovered server 102, it is possible to quickly balance the load of the HTTP session after the recovery of the server 102 (see, the third row in FIG. 6).

Figure 7:
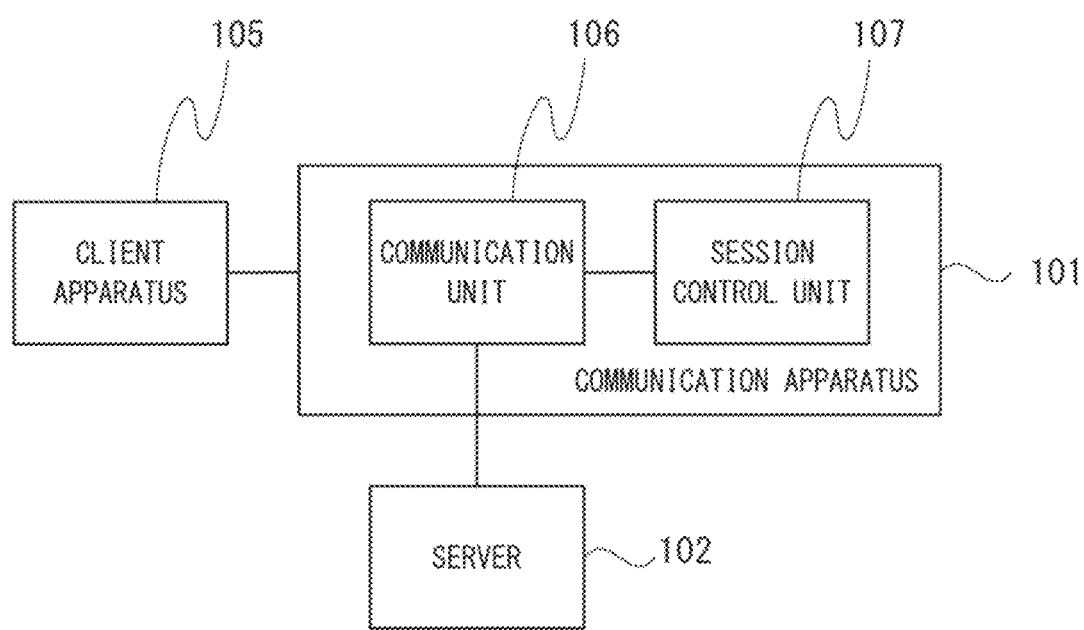
FIG. 7 is a configuration diagram of communication apparatus according to the first and second example embodiments.

Next, the inside of the communication apparatus of the communication systems according to the first and second example embodiments will be described. FIG. 7 is a configuration diagram of a communication apparatus according to the present example embodiment. The communication apparatus 101 includes a communication unit 106 and a session control unit 107. The communication unit 106 establishes an HTTP session with the server 102 and performs REST communication with the client apparatus 105. After the REST communication that has been initiated based on the calling signal received from the client apparatus 105 ends, the session control unit 107 transmits a keepalive signal to the server 102 via the communication unit 106 and maintains the HTTP session.

This configuration of the communication apparatus 101 enables efficient execution of the communication method according to the present disclosure.

In the foregoing example, the program includes instructions (or software codes) that, when loaded into a computer, cause the computer to perform one or more of the functions described in the example embodiments. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

It should be noted that the present disclosure is not limited to the above example embodiments and may be modified accordingly to the extent that it does not deviate from the purpose. Further, the present disclosure may be implemented by combining the respective example embodiments as appropriate.

The whole or part of the example embodiments described above can be described as, but not limited to, the following supplementary notes.

Supplementary Note 1

A communication system comprising:
a server; and
a communication apparatus for performing a REST (Representational State Transfer) communication using an HTTP (Hypertext Transfer Protocol) session established with the server,
wherein the communication apparatus is configured to transmit a keepalive signal to the server after the REST communication that has been initiated based on a calling signal received from a client apparatus ends, and to transmit a response signal in response to the calling signal to the client apparatus while maintaining the HTTP session.

Supplementary Note 2

The communication system according to Supplementary Note 1, wherein
the server is configured to transmit a REST response signal to the communication apparatus in response to a REST request signal received from the communication apparatus, and
the communication apparatus is configured to transmit the keepalive signal to the server upon receipt of the REST response signal.

Supplementary Note 3

The communication system according to Supplementary Note 1 or 2, wherein the communication apparatus is configured to establish the HTTP session with the server at the time of start-up of the communication apparatus.

Supplementary Note 4

The communication system according to any one of Supplementary Notes 1 to 3, wherein the communication apparatus is configured to establish the HTTP session with a plurality of the servers, and in the case where a failure occurs in a first server included in the plurality of the servers, establish the HTTP session that had been established with the first server included in the plurality of the servers with a server other than the first server.

Supplementary Note 5

The communication system according to Supplementary Note 4, wherein the communication apparatus is configured to allot the HTTP session established with the first server included in the plurality of servers to servers other than the first server so that loads on the servers other than the first server are brought close to being even.

Supplementary Note 6

The communication system of Supplementary Note 4, wherein the communication apparatus is configured to select, when a failure occurs in the first server, a second server included in the plurality of servers, exclude the second server from the target of transmission of the keepalive signal after the REST communication with the second server ends, and disconnect an HTTP session established with the second server.

Supplementary Note 7

The communication system according to Supplementary Note 6, wherein the communication apparatus is configured to establish an HTTP session with the second server that is disconnected with a server other than the first server among the plurality of the servers in the case where the first server has not recovered from the failure and establish an HTTP session with the second server that is disconnected with the first server in the case where the first server has recovered from the failure.

Supplementary Note 8

A communication apparatus, comprising:
a communication unit configured to perform a REST (Representational State Transfer) communication using an HTTP (Hypertext Transfer Protocol) session established with a server; and
a session control unit configured to transmit a keepalive signal to the server via the communication unit after the REST communication that has been initiated based on a calling signal received from a client apparatus ends and maintain the HTTP session,
wherein the communication unit is configured to transmit a response signal in response to the calling signal to the client apparatus while maintaining the HTTP session.

Supplementary Note 9

The communication apparatus according to Supplementary Note 8, wherein the communication unit is configured to transmit a REST request signal to the server based on the calling signal received from the client apparatus, and transmit a keepalive signal to the server when a REST response signal in response to the REST request signal is received from the server.

Supplementary Note 10

A communication method comprising:
initiating a REST (Representational State Transfer) communication using an HTTP (Hypertext Transfer Protocol) session established with a server based on a calling signal received from a client apparatus;
transmitting a keepalive signal to the server to maintain the HTTP session after the REST communication ends; and
transmitting a response signal in response to the calling signal to the client apparatus while maintaining the HTTP session.

Supplementary Note 11

A non-transitory computer-readable medium storing a program for causing a computer to execute processes of:
initiating a REST (Representational State Transfer) communication using an HTTP (Hypertext Transfer Protocol) session established with a server based on a calling signal received from a client apparatus;
transmitting a keepalive signal to the server to maintain the HTTP session after the REST communication ends; and
transmitting a response signal in response to the calling signal to the client apparatus while maintaining the HTTP session.

REFERENCE SIGNS LIST

101 COMMUNICATION APPARATUS
102 SERVER
103 SERVER
104 SERVER
105 CLIENT APPARATUS
106 COMMUNICATION UNIT
107 SESSION CONTROL UNIT

What is claimed is:
1. A communication system comprising:
a server;
a memory configured to store instructions; and
a processor configured to execute the instructions to:
perform a REST (Representational State Transfer) communication using an HTTP (Hypertext Transfer Protocol) session established with the server;
transmit a keepalive signal to the server after the REST communication that has been initiated based on a calling signal received from a client apparatus;
transmit a response signal in response to the calling signal to the client apparatus while maintaining the HTTP session;
establish the HTTP session with a plurality of the servers, and in the case where a failure occurs in a first server included in the plurality of the servers, establish the HTTP session that had been established with the first server included in the plurality of the servers with a server other than the first server; and
allot the HTTP session established with the first server included in the plurality of servers to servers other than the first server so that loads on the servers other than the first server are brought close to being even.

2. The communication system accordingto claim 1, wherein the server is configured to transmit a REST response signal in response to receiving a REST request signal, and the processor is further configured to execute the instructions to transmit the keepalive signal to the server upon receipt of the REST response signal.

3. The communication system according to claim 2, wherein the processor is further configured to execute the instructions to establish the HTTP session with the server at the time of start-up.

4. The communication system according to claim 1, wherein the processor is further configured to execute the instructions to select, when a failure occurs in the first server, a second server included in the plurality of servers, exclude the second server from the target of transmission of the keepalive signal after the REST communication with the second server ends, and disconnect an HTTP session established with the second server.

5. The communication system according to claim 4, wherein the processor is further configured to executethe instructions to establish an HTTP session with the second server that is disconnected with a server other than the first server among the plurality of the servers in the case where the first server has not recovered from the failure and establish an HTTP session with the second server that is disconnected with the first server in the case where the first server has recovered from the failure.

6. A communication apparatus comprising:
a memory configured to store instructions; and
a processor configured to execute the instructions to:
perform a REST (Representational State Transfer) communication using an HTTP (Hypertext Transfer Protocol) session established with a server;
transmit a keepalive signal to the server after the REST communication that has been initiated based on a calling signal received from a client apparatus ends and maintain the HTTP session;
transmit a response signal in response to the calling signal to the client apparatus while maintaining the HTTP session;
establish the HTTP session with a plurality of the servers, and in the case where a failure occurs in a first server included in the plurality of the servers, establish the HTTP session that had been established with the first server included in the plurality of the servers with a server other than the first server; and
allot the HTTP session established with the first server included in the plurality of servers to servers other than the first server so that loads on the servers other than the first server are brought close to being even.

7. The communication apparatus according to claim 6, wherein the processor is further configured to execute the instructions to transmit a REST request signal to the server based on the calling signal, and transmit a keepalive signal to the server when a REST response signal in response to the REST request signal is received from the server.

8. The communication apparatus according to claim 7, wherein the processor is further configured to execute the instructions to establish the HTTP session with the server at the time of start-up of the communication apparatus.

9. The communication apparatus according to claim 6, wherein the processor is further configured to execute the instructions to select, when a failure occurs in the first server, a second server included in the plurality of servers, exclude the second server from the target of transmission of the keepalive signal after the REST communication with the second server ends, and disconnect an HTTP session established with the second server.

10. The communication apparatus according to claim 9, wherein the processor is further configured to executethe instructions to establish an HTTP session with the second server that is disconnected with a server other than the first server among the plurality of the servers in the case where the first server has not recovered from the failure and establish an HTTP session with the second server that is disconnected with the first server in the case where the first server has recovered from the failure.

11. A communication method comprising:
- initiating a REST (Representational State Transfer) communication using an HTTP (Hypertext Transfer Protocol) session established with a server based on a calling signal received from a client apparatus;
- transmitting a keepalive signal to the server to maintain the HTTP session after the REST communication ends;
- transmitting a response signal in response to the calling signal to the client apparatus while maintaining the HTTP session;
- establishing the HTTP session with a plurality of the servers, and in the case where a failure occurs in a first server included in the plurality of the servers, establishing the HTTP session that had been established with the first server included in the plurality of the servers with a server other than the first server; and
- allotting the HTTP session established with the first server included in the plurality of servers to servers other than the first server so that loads on the servers other than the first server are brought close to being even.

\* \* \* \* \*